United States Patent
Nishi et al.

(10) Patent No.: US 9,610,656 B2
(45) Date of Patent: Apr. 4, 2017

(54) LEAD-FREE SOLDER ALLOY FOR VEHICLE GLASS

(75) Inventors: Mizuki Nishi, Matsusaka (JP); Takayuki Ogawa, Yokohama (JP); Mitsuo Hori, Ichikawa (JP)

(73) Assignee: Central Glass Company, Limited, Ube-shi (JP)

( * ) Notice: Subject to any disclaimer, the term of this patent is extended or adjusted under 35 U.S.C. 154(b) by 636 days.

(21) Appl. No.: 14/001,619

(22) PCT Filed: Feb. 27, 2012

(86) PCT No.: PCT/JP2012/054699
§ 371 (c)(1),
(2), (4) Date: Aug. 26, 2013

(87) PCT Pub. No.: WO2012/117988
PCT Pub. Date: Sep. 7, 2012

(65) Prior Publication Data
US 2013/0336837 A1    Dec. 19, 2013

(30) Foreign Application Priority Data
Mar. 2, 2011    (JP) ................. 2011-045339

(51) Int. Cl.
B23K 35/26    (2006.01)
C22C 13/00    (2006.01)
C22C 28/00    (2006.01)
C22C 30/04    (2006.01)
C22C 1/02    (2006.01)

(52) U.S. Cl.
CPC ............ B23K 35/262 (2013.01); B23K 35/26 (2013.01); C22C 1/02 (2013.01); C22C 13/00 (2013.01); C22C 28/00 (2013.01); C22C 30/04 (2013.01)

(58) Field of Classification Search
CPC ........ B23K 35/26; B23K 35/262; C22C 1/02; C22C 13/00; C22C 28/00; C22C 30/04
See application file for complete search history.

(56) References Cited

U.S. PATENT DOCUMENTS

| 5,942,185 | A  | 8/1999  | Nakatsuka et al. |
| 6,077,477 | A  | 6/2000  | Sakai et al. |
| 6,253,988 | B1 | 7/2001  | Pereira |
| 6,319,461 | B1 | 11/2001 | Domi et al. |
| 6,325,279 | B1 | 12/2001 | Sakai et al. |
| 7,159,756 | B2 | 1/2007  | Winter et al. |
| 7,617,964 | B2 | 11/2009 | Winter et al. |
| 7,628,871 | B2 | 12/2009 | Suh |
| 2005/0045700 | A1 | 3/2005 | Winter et al. |
| 2007/0034305 | A1 | 2/2007 | Suh |
| 2007/0036670 | A1 | 2/2007 | Pereira |
| 2007/0037004 | A1 | 2/2007 | Pereira |
| 2007/0128448 | A1 | 6/2007 | Saimi |
| 2007/0152019 | A1 | 7/2007 | Winter et al. |
| 2007/0231594 | A1 | 10/2007 | Pereira |
| 2008/0175748 | A1 | 7/2008 | Pereira |
| 2010/0037990 | A1 | 2/2010 | Suh |

FOREIGN PATENT DOCUMENTS

| CN | 1304344 A       | 7/2001  |
| CN | 1313802 A       | 9/2001  |
| CN | 1842415 A       | 10/2006 |
| CN | 101001717 A     | 7/2007  |
| CN | 101257995 A     | 9/2008  |
| EP | 1 080 824 A1    | 3/2001  |
| JP | 8-164495 A      | 6/1996  |
| JP | 9-326554 A      | 12/1997 |
| JP | 2000-119046 A   | 4/2000  |
| JP | 2000-141078 A   | 5/2000  |
| JP | 2007-504005 A   | 3/2007  |
| JP | 2009-504411 A   | 2/2009  |
| JP | 2009-509767 A   | 3/2009  |
| WO | WO 00/58051 A1  | 10/2000 |

OTHER PUBLICATIONS

Doken et al., English machine translation of JP 2000-141078, May 23, 2000, p. 1-9.*
Chinese Office Action dated Jan. 6, 2015 (Six (6) pages).
Extended European Search Report dated Jun. 16, 2015 (four (4) pages).
International Search Report dated May 1, 2012 with English translation (five (5) pages).
Japanese-language Written Opinion (PCT/ISA/237) dated May 1, 2012 (three (3) pages).

* cited by examiner

Primary Examiner — Roy King
Assistant Examiner — Caitlin Kiechle
(74) Attorney, Agent, or Firm — Crowell & Moring LLP

(57) ABSTRACT

A lead-free solder alloy for a vehicle glass according to the present invention contains 26.0 to 56.0 mass % of In, 0.1 to 5.0 mass % of Ag, 0.002 to 0.05 mass % of Ti, 0.001 to 0.01 mass % of Si and the balance being Sn. The lead-free solder alloy may optionally contain 0.005 to 0.1 mass % of Cu and 0.001 to 0.01 mass % of B. This solder alloy can suitably be applied vehicle glasses and show good joint strength to glass materials and high acid resistance, salt water resistance and temperature cycle resistance.

1 Claim, No Drawings

LEAD-FREE SOLDER ALLOY FOR VEHICLE GLASS

TECHNICAL FIELD

The present invention relates to a lead-free solder alloy for joining a glass part with a conductor to a metal terminal and a glass article using the lead-free solder alloy.

BACKGROUND ART

Some glass articles for automotive and architectural uses have conductor wires formed thereon as defoggers in order to ensure visibility. Further, rear and side windows for automotive vehicles are sometimes equipped with glass antennas. The glass antennas have respective patterns of conductor wires, called "antenna patterns", formed on surfaces of glass plates.

These conductor wires are connected to metal terminals for power supply (referred to as "power supply terminals"). The power supply terminals are conventionally joined to glass parts by lead-containing solders. However, lead is generally a highly toxic environmental pollutant substance so that the influences of lead on the health and environment, notably the deleterious effects of lead on the ecosystem and the pollution of the ecosystem by lead, are becoming a matter of concern. In particular, there is a concern that, in the case where glass articles with lead-containing solders are thrown out as waste, lead may be eluted into the environment upon adhesion of acid rain etc. to these solders.

The use of lead-free solders in electronic boards has thus been spreading rapidly in the home-appliance industry. However, solders for joining glass parts and metal terminals are required to achieve a higher level of joint strength than those of solders for electronic boards and are likely to cause, in response to sudden temperature changes, problems such as deterioration in joint strength and cracking of glass surface by concentration of stress on the solder joints between the glass parts and the metal terminals due to difference in thermal expansion coefficient between glass and metal.

A Sn-3Ag-0.5Cu solder alloy (Sn-based solder alloy containing 3 mass % of Ag and 0.5 mass % of Cu) is currently used as the mainstream of the lead-free solder for electronic boards and regarded as one of reliable solder alloys because of its high joint strength on electronic boards (see Patent Document 1).

There are also known various solder alloys such as Sn—Zn—Bi alloy (see Patent Document 2) and Sn—In—Ag alloy (see Patent Document 3) for electronic boards.

PRIOR ART DOCUMENTS

Patent Documents

Patent Document 1: Published Japanese Translation of PCT International Application No. 2009-509767
Patent Document 2: Japanese Laid-Open Patent Publication No. H08-164495
Patent Document 3: Japanese Laid-Open Patent Publication No. H09-326554

SUMMARY OF THE INVENTION

Problems to be Solved by the Invention

The Sn—Ag—Cu solder alloy, which is the current mainstream of the electronic board solder, has high joint strength on electronic boards as mentioned above. However, this solder alloy is a high-rigidity metal material having a high Young's modulus of 50 GPa and thus cannot be used as it is for joints between rigid glass and metal parts.

More specifically, the Sn—Ag—Cu solder alloy as disclosed in Patent Document 1 may have a problem such as solder joint separation, glass cracking etc. with the application of mechanical stress or stress due to difference in thermal expansion coefficient.

The Sn—Zn—Bi solder alloy as disclosed in Patent Document 2 is being improved in terms of Young's modulus. The use of the Sn—Zn—Bi solder alloy has however recently been restricted in view of the fact that this solder alloy contains Bi, which is also highly toxic as in the case of lead.

The Sn—In—Ag solder alloy as disclosed in Patent Document 3 is expected to be suitable for automotive uses as the Young's modulus of this solder alloy can be limited to a lower value. It has however become apparent that the Sn—In—Ag solder alloy is not still sufficient in performance for outside uses such as automotive vehicles. For example, the Sn—In—Ag solder alloy has difficulty in ensuring a satisfactory level of acid resistance for uses under exposure to acid rain etc., salt water resistance for uses under exposure to sea water, snow/ice inhibitor etc. and temperature cycle resistance for uses under exposure to night-day temperature differences in cold climates.

In this way, lead-free solders for joints to conductors in vehicle glass articles require higher performance than those for electronic boards It is accordingly an object of the present invention to provide a lead-free solder alloy that is suitable for applications to vehicle glasses and to provide a glass article using such a lead-free solder alloy.

Means for Solving the Problems

There is provided according one aspect of to the present invention a lead-free solder alloy for a vehicle glass, comprising: 26.0 to 56.0 mass % of In; 0.1 to 5.0 mass % of Ag; 0.002 to 0.05 mass % of Ti; 0.001 to 0.01 mass % of Si; and the balance being Sn.

There is provided according to another aspect of the present invention a lead-free solder alloy for a vehicle glass, comprising: 26.0 to 56.0 mass % of In; 0.1 to 5.0 mass % of Ag; 0.005 to 0.1 mass % of Cu; 0.002 to 0.05 mass % of Ti; 0.001 to 0.01 mass % of Si; 0.001 to 0.01 mass % of B; and the balance being Sn.

The lead-free solder alloys according to the present invention have good joint strength to glass materials and high acid resistance, salt water resistance and temperature cycle resistance for suitable applications to vehicle glasses.

DETAILED DESCRIPTION OF THE EMBODIMENTS

Hereinafter, the present invention will be described in detail below.

The lead-free solder alloy according to the present invention contains, as constituent components, In, Sn, Ag, Ti and Si and may optionally contain Cu and B.

In the present invention, the In content of the solder alloy is preferably in a range of 26.0 to 56.0 mass %. If the In content is less than 26.0 mass %, the resulting solder alloy becomes high in Young's modulus and may cause glass cracking. If the In content exceeds 56 mass %, the resulting solder alloy may cause deterioration in joint strength in the occurrence of residual internal stress due to a phase change of $In_3Sn/In_3Sn+InSn_4$ or cracking even by temperature changes in a room temperature range. The In content of the solder alloy is more preferably 31.0 to 51.0 mass % in the present invention.

With the addition of appropriate amounts of Ag, Ti and Si to In and Sn, the solder alloy can stabilize its crystal structure by fine crystal formation and retard oxidization properties characteristic to In-containing alloy. The solder alloy can also stabilize its target temperature range for good joint formation.

During heat soldering (e.g. soldering by means of a soldering iron, gas burner, heat blow, furnace, ultrasonic wave etc.), In—Sn binary alloy can form a stable joint by low-melting eutectic at 117° C. In the case of soldering to a vehicle glass, however, the solder alloy may reach a temperature close or equal to its eutectic temperature. It is thus necessary to raise a liquidus temperature of the solder alloy. The liquidus temperature of the solder alloy can be lowered with increase of the Sn content and decrease of the In content. When the Sn content of the solder alloy is increased, however, Sn crystals are overgrown and dispersed in the joint by the action of heat during the soldering. This makes it likely that separation of the solder joint will occur as the strength of the joint deteriorates with the passage of time. In the present invention, Ag, Ti and Si are added in appropriate amounts to In and Sn as a technique to form a stable joint without causing secular change, separation, cracking etc. It is therefore possible to provide the low-melting solder alloy such that the solder alloy can form a stable joint with fine crystal structure and retard its oxidation properties for stable physical characteristics.

Further, the solder alloy can form a natural oxide film with fine (spinel) structure with the addition of appropriate amounts of Ag, Cu, Ti, Si and B to In and Sn. This makes the natural oxide film of the solder alloy more uniform and stable than that of In—Sn binary alloy and contributes to prevention of surface corrosion.

The crystal structure inside and at the surface of the solder alloy can be obtained so as to secure durability to withstand environmental conditions, such as heat resistance, corrosion resistance and weather resistance, and not to cause secular change and separation of the solder joint from the substrate, by the formation of the fine(spinel)-structured natural oxide film during heat soldering (e.g. soldering by means of a soldering iron, gas burner, heat blow, furnace, ultrasonic wave etc.). Namely, the natural oxide film can be made uniform to form a stable joint because of the fine structure of the oxide film. As a technique to form such a stable joint by fine uniform oxide film formation, Ag, Cu, Ti, Si and B are added in appropriate amounts to In and Sn in the present invention. It is therefore possible to provide the low-melting solder alloy such that the solder alloy can form a stable joint with fine oxide film crystal structure and retard its oxidation properties for stable physical characteristics.

In the case where the solder alloy contains Ag, the Ag content of the solder alloy is preferably in a range of 0.1 to 5.0 mass % in the present invention. The addition of Ag provides a significant effect on the improvement of the mechanical strength of the solder alloy. In the vehicle glass, silver wires can be formed as defogger hot wires or antenna wires by screen printing, drying and firing a silver paste. The addition of Ag to the solder alloy is effective in, when these silver wires are joined by the solder to power supply terminals for contact to a vehicle body, preventing the silver wires from being corroded by the solder. These effects are small if the Ag content is less than 0.1 mass %. If the Ag content exceeds 5 mass %, the deposition of coarse Ag3Sn may occur to cause deterioration in joint strength and fatigue strength. The Ag content of the solder alloy is more preferably 0.5 to 3.0 mass %.

In the case where the solder alloy contains Cu, the Cu content of the solder alloy is preferably in a range of 0.005 to 0.1 mass % in the present invention. The resulting solder joint may not attain a sufficient level of joint strength if the Cu content is out of this range. The Cu content of the solder alloy is more preferably 0.005 to 0.05 mass %.

Although Ti is a very easily oxidizable element, the addition of Ti makes it easier to form a bond in the case of soldering to an oxide. Further, the liquidus temperature of the solder alloy can be raised by the addition of Ti. When the Sn content of the solder alloy is increased, Sn crystals are overgrown and dispersed in the joint by the action of heat during the soldering so that that separation of the solder joint is likely to occur as the strength of the joint deteriorates with the passage of time as mentioned above. The addition of Ti is also effective in preventing such a problem. These effects are provided sufficiently even by the addition of a trace amount of Ti. Thus, the Ti content of the solder alloy is preferably in a range of 0.002 to 0.05 mass %, more preferably 0.005 to 0.03 mass %, in the present invention.

The addition of Si makes it possible that the structure of the solder alloy can be made fine by the deposition of Si between boundaries of the respective metal components during a process from a molten state to solidification of the solder alloy. This effect is provided sufficiently even by the addition of a trace amount of Si. Thus, the Si content of the solder alloy is preferably in a range of 0.001 to 0.01 mass %, more preferably 0.002 to 0.008 mass %, in the present invention.

The addition of B together with Cu allows formation of the fine(spinel)-structured oxide film during the heat soldering (e.g. soldering by means of a soldering iron, gas burner, heat blow, furnace, ultrasonic wave etc.). The crystal structure at the surface of the solder alloy can be thus obtained to secure durability to withstand environmental conditions, such as heat resistance, corrosion resistance and weather resistance, and not to cause secular change and separation of the solder joint from the substrate. Namely, the oxidation properties of the solder alloy can be retarded for stable physical characteristics. This effect is provided sufficiently even by the addition of a trace amount of B. Thus, the B content of the solder alloy is preferably in a range of 0.001 to 0.01 mass %, more preferably 0.002 to 0.008 mass %, in the present invention.

EXAMPLES

The present invention will be described in more detail below by way of the following examples. It should be noted that the following examples are illustrative and are not intended to limit the present invention thereto.

Solder alloys of Examples 1-8 shown in TABLE 1 and Comparative Examples 1-5 shown in TABLE 2 were each produced by mixing alloy components at their respective contents, and then, melting the resulting mixture in a vacuum.

On the other hand, soda lime glass substrates having a size of 350 mm×150 mm and a thickness of 3.5 mm were provided and each processed by screen printing with a black ceramic paste and a silver paste in the same manner as in an ordinary process of forming, on a vehicle glass, a black frame and a silver busbar part for conductor-to-terminal connection. The black ceramic paste was printed through a screen of mesh size #180 onto the soda lime glass substrate and dried. The silver paste was next printed through a screen of mesh size #200 on the ceramic print and dried to form silver prints (size: 12 mm×70 mm, 15 locations). The resulting screen-printed glass substrates were finished by heat treatment as reinforced glass boards.

The above-produced solder alloys were applied with a thickness of 2 mm to terminals of C2801P (brass plate) according to JIS H 3100. The terminals with the solder alloys were set on the glass substrates and soldered to the silver parts of the glass substrates by heating and melting the solder alloys with hot air of 300° C. or higher, respectively.

The thus-obtained test samples were tested by the following joint strength test, appearance test, temperature cycle test and salt water spray test.

The initial joint strength was determined according to JIS C 62137 by performing a tensile test operation on the sample with the use of a push-pull gauge. The sample was rated as "passing" in the joint strength test when no separation of the solder joint occurred under the application of a tension of 80 N.

The initial appearance was determined by visually checking the occurrence or non-occurrence of a crack in the surface of the solder joint. The sample was rated as "passing" in the appearance test when there was seen no crack in the surface of the solder joint.

The temperature cycle test was performed with reference to the procedure of thermal cycle resistance test according to JIS C 2807. More specifically, the sample was subjected to 100 thermal cycles assuming an operation of changing the sample temperature from 20° C. (3 minutes) to −30° C. (30 minutes), to 20° C. (3 minutes), to 85° C. (30 minutes) and then to 20° C. (3 minutes) as one thermal cycle. The sample was rated as "passing" in the temperature cycle test when there was seen no appearance change (crack) in the surface of the glass substrate after 100 thermal cycles. It is herein noted that, in JIS C 2807, the lower temperature value is set to −25° C.

The salt water spray test was performed by spraying an 5% aqueous NaCl solution onto the solder joint at a spray pressure of 0.1 MPa in an atmosphere of 35° C. continuously for 100 hours, 200 hours and 300 hours. The sample was rated as "passing" in the salt water spray test when the joint strength of the solder joint was 80 N or higher after the test.

The solder compositions and test results are shown in TABLES 1 and 2. In TABLES 1 and 2, the results of the salt water spray test are indicated by the following symbols: "X" as failing after the test of 100 hours; "Δ" as passing after the test of 100 hours; "○" as passing after the test of 200 hours; and "◎" as passing after the test of 300 hours; and the passing and failing grades of the other tests are indicated by the symbols "○" and "X", respectively.

TABLE 1

| | | Example No. | | | | | | | |
|---|---|---|---|---|---|---|---|---|---|
| | | 1 | 2 | 3 | 4 | 5 | 6 | 7 | 8 |
| Constituent elements (mass %) | Sn | balance | balance | balance | balance | balance | balance | balance | balance |
| | In | 51.0 | 56.0 | 51.0 | 31.0 | 31.0 | 46.0 | 26.0 | 41.0 |
| | Ag | 1.0 | 1.5 | 0.5 | 0.2 | 5.0 | 5.0 | 3.0 | 1.0 |
| | Cu | — | 0.05 | 0.02 | — | 0.1 | 0.1 | — | 0.01 |
| | Ti | 0.005 | 0.015 | 0.01 | 0.005 | 0.03 | 0.05 | 0.02 | 0.005 |
| | Si | 0.01 | 0.015 | 0.005 | 0.005 | 0.03 | 0.01 | 0.05 | 0.005 |
| | B | — | 0.005 | 0.002 | — | 0.005 | 0.01 | — | 0.002 |
| Initial joint strength | | ○ | ○ | ○ | ○ | ○ | ○ | ○ | ○ |
| Initial appearance | | ○ | ○ | ○ | ○ | ○ | ○ | ○ | ○ |
| Temperature cycle test result | | ○ | ○ | ○ | ○ | ○ | ○ | ○ | ○ |
| Salt water spray test result | | ○ | ◎ | ◎ | ○ | ◎ | ◎ | ○ | ◎ |

TABLE 2

| | | Comparative Example No. | | | | |
|---|---|---|---|---|---|---|
| | | 1 | 2 | 3 | 4 | 5 |
| Constituent elements (mass %) | Sn | balance | balance | balance | balance | balance |
| | In | 20.0 | 51.0 | 20.0 | 56.0 | 46.0 |
| | Ag | 1.0 | 1.0 | 1.0 | 10.0 | 1.0 |
| | Cu | 0.02 | — | — | 0.02 | 1.0 |
| | Ti | 0.01 | — | 0.005 | 0.01 | 0.1 |
| | Si | 0.005 | — | 0.005 | 0.005 | 0.1 |
| | B | 0.002 | — | — | 0.002 | 0.1 |
| Initial joint strength | | ○ | ○ | X | ○ | ○ |
| Initial appearance | | X | ○ | X | X | ○ |
| Temperature cycle test result | | X | ○ | X | X | ○ |
| Salt water spray test result | | ○ | Δ | X | X | Δ |

As shown in TABLE 1, the samples of Examples 1-8, each of which had the solder composition according to the present invention, were good in terms of both of joint strength and appearance.

By contrast, the samples of Comparative Examples 1-5, each of which did not have the solder composition according to the present invention, were poor in term of either or both of joint strength or appearance. These lead-free solder alloys were not suitable for joints between metal terminals and glass articles.

INDUSTRIAL APPLICABILITY

The lead-free solder alloy according to the present invention is suitable for joints between metal terminals and glass articles and is thus applicable to a wide field of uses such as automotive and architectural conductor wires and glass antennas.

Although the present invention has been described with reference to the above embodiments, various modifications and variations of the above embodiments can be made based on the knowledge of those skilled in the art without departing from the scope of the present invention.

The invention claimed is:
1. A lead-free solder alloy for a vehicle glass, comprising:
26.0 to 56.0 mass % of In;
0.1 to 5.0 mass % of Ag;
0.005 to 0.1 mass % of Cu;
0.002 to 0.05 mass % of Ti;
0.001 to 0.05 mass % of Si;
0.001 to 0.01 mass % of B; and
the balance being Sn.

* * * * *